(12) United States Patent
Gill et al.

(10) Patent No.: US 6,557,141 B1
(45) Date of Patent: Apr. 29, 2003

(54) MAGNETIC MEDIA CERTIFICATION

(75) Inventors: Richard A. Gill, Arvada, CO (US);
Roger D. Hayes, Denver, CO (US)

(73) Assignee: Storage Technology Corporation, Louisville, CO (US)

( * ) Notice: Subject to any disclaimer, the term of this patent is extended or adjusted under 35 U.S.C. 154(b) by 0 days.

(21) Appl. No.: 09/452,519

(22) Filed: Dec. 1, 1999

(51) Int. Cl.⁷ .......................... G11C 29/00; G11B 20/18
(52) U.S. Cl. .................. 714/771; 714/719; 369/53.1
(58) Field of Search ................. 714/719, 771; 369/53.1

(56) References Cited

U.S. PATENT DOCUMENTS

| | | | |
|---|---|---|---|
| 3,997,876 A | | 12/1976 | Frush |
| 4,323,844 A | * | 4/1982 | Mikame ................. 324/212 |
| 4,980,878 A | * | 12/1990 | Szerlip ................. 369/53.15 |
| 5,124,849 A | * | 6/1992 | Chur ..................... 360/31 |
| 5,365,333 A | * | 11/1994 | Wirth et al. .......... 356/244 |
| 5,369,641 A | | 11/1994 | Dodt et al. |
| 5,394,280 A | * | 2/1995 | Chliwnyj et al. ...... 360/48 |
| 5,568,650 A | * | 10/1996 | Mori ..................... 710/52 |
| 5,974,544 A | * | 10/1999 | Jeffries et al. ......... 710/10 |
| 5,995,306 A | * | 11/1999 | Contreras et al. ..... 360/31 |
| 6,031,673 A | * | 2/2000 | Fasen et al. ........... 360/53 |

FOREIGN PATENT DOCUMENTS

| | | |
|---|---|---|
| EP | 0529857 | 3/1993 |
| EP | 0889474 | 1/1999 |
| GB | 2336464 | 10/1999 |

* cited by examiner

*Primary Examiner*—Albert Decady
*Assistant Examiner*—Anthony Whittington
(74) *Attorney, Agent, or Firm*—Brooks & Kushman P.C.

(57) ABSTRACT

Write on the fly certification of magnetic media includes detecting the start of a defect. A sequence of defect matrices is written over the defect with a write element in a read-after-write head. Each defect matrix in the sequence is read with a read element in the read-after-write head. A check is made to determine if an error exists in the data read from each defect matrix. The defect is determined to extend through each defect matrix if an error exists in the read data.

20 Claims, 4 Drawing Sheets

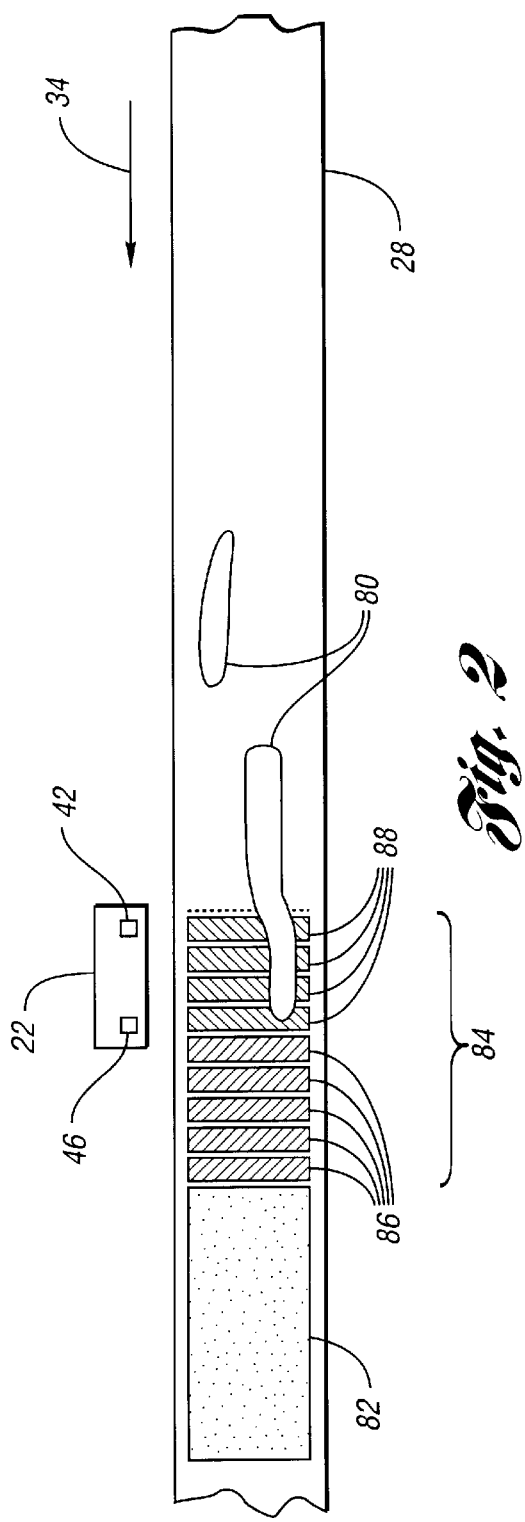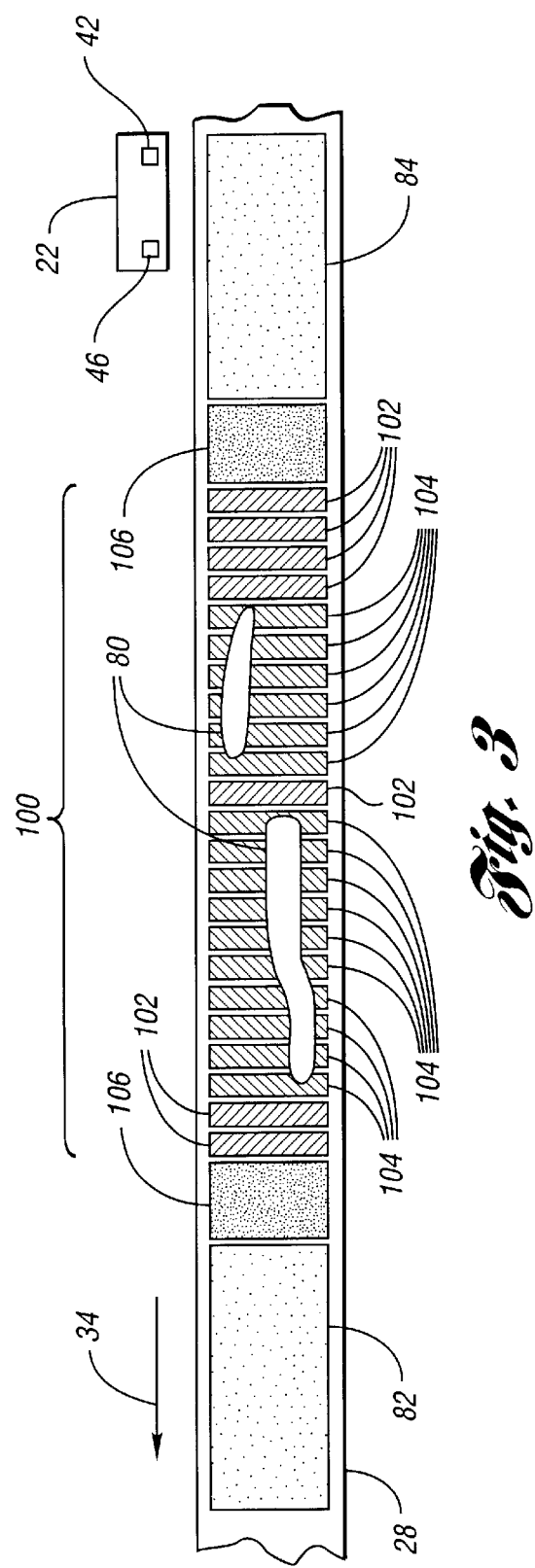

MAGNETIC MEDIA CERTIFICATION

TECHNICAL FIELD

The present invention relates to certifying that a region on magnetic media is defective.

BACKGROUND ART

Data is written onto magnetic media, such as magnetic tape, for storage and subsequent retrieval. Generally, data is written onto the tape in contiguous blocks separated by gaps. The gaps delimit blocks and assist in finding the beginning of a particular block during read operations. Each block may be further divided into matrices, with each matrix representing a data segment. Occasionally, through a defect in manufacturing or wear, a defect in the magnetic media will prevent the successful writing of one or more matrices. Detecting and bypassing such defects is important to the efficient operation of a tape access system.

A typical tape access system includes a tape head with a write module and a read module trailing the write module in the direction of tape travel. The write module contains a plurality of write elements for simultaneously writing many data tracks. Similarly, the trailing read module contains a plurality of read elements for simultaneously reading the data tracks. Following each write element with a read element permits immediate read after write to verify that the data has been correctly written onto the tape. Write circuitry converts data into write module write signals. Read circuitry converts read module read signals into data. A drive controller controls one or more motors for moving the tape past the tape head in a particular direction and at a particular speed. A head position servo positions the head across the width of the tape to permit write and real elements access to appropriate data tracks. Head position relative to the tape is determined by reading servo tracks on the tape with servo read elements on the head.

If, during a write operation, data read by the trailing read head does not match the data just written by the write head, a write error has occurred. Write errors result from many causes including incorrect positioning of the tape head relative to the tape, incorrect tape velocity, defects on the tape, and the like. Typically, when a write error is detected, the tape is rewound and one or more attempts to rewrite the data are performed. After several unsuccessful attempts to write the data with proper tape velocity and tape head positioning, the problem is assumed to be a defect on the tape. In order to prevent incorrectly reading this region of the tape during a subsequent read operation and to prevent subsequent write operations to this region, the tape is marked or certified to indicate the defective area.

One method of defect certification is to record a fixed length tone pattern such as an erase gap over a short length of tape and then begin rewriting the data. This is repeated until the data block is successfully written. A second method is to continue write attempts until the far end of the tape defect is found. Special blocks are then written before and after the defect. These special blocks contain data permitting the tape system to compute the distance to the opposite end of the defective area.

If the write error resulted from head positioning difficulties, the write operation is immediately terminated to prevent overwriting adjacent data tracks. Hence, the first method of writing fixed length tone patterns is not appropriate. Instead, a technique similar to the second method used for tape defects is often employed. This may, however, result in partially written data blocks being left on the tape between the special marks.

Several problems exist with certifying defective regions on magnetic tape such as due to defects on the tape and servo track errors. First, the use of short erase blocks requires an excessive amount of time for long tape defects because the tape system attempts multiple rewrites after each short erase pattern. While the time may be decreased through using longer erase blocks, the resulting tape wasted by erase gaps covering non-defective tape decreases the density of data which can be stored on the tape. Second, partial data blocks recorded between special marks in the second method may be incorrectly interpreted as good data during a search for data blocks in a tape read operation. Third, both methods require time consuming rewind operations. What is needed is to certify magnetic media in a manner that does not require excessive time, does not waste non-defective tape, and does not leave partial data blocks in defective regions of the tape.

DISCLOSURE OF INVENTION

It is an object of the present invention to certify defective regions of magnetic media on the fly.

It is another object of the present invention to certify magnetic media without excessive tape rewind.

It is still another object of the present invention to certify magnetic media without leaving partial data blocks in defective regions of tape.

In carrying out the above objects and other objects and features of the present invention, a method for certifying that a track of magnetic media is defective is provided. The start of a defect is detected. A sequence of defect matrices is written over the defect with the write element in a read-after-write tape head. Each defect matrix may include a worst case data pattern. Each defect matrix in the sequence is read with a read element in the read-after-write head. A check is made to determine if an error exists in data read from each defect matrix. If an error is found, a check is made to determine that the defect extends through each defect matrix.

In an embodiment of the present invention, the number of consecutive defect matrices not containing an error is counted. The defect is determined to have ended when the number of consecutive error-free defect matrices exceeds a threshold.

In another embodiment of the present invention, a preset number of defect matrices is written following the last defect matrix containing the defect.

In still another embodiment of the present invention, the method includes counting the number of defect matrices prior to locating the defect end and terminating the defect certification if the number of counted defect matrices exceeds a threshold.

In yet another embodiment of the present invention, the method includes writing special characters preceding the defect indicating the start of the defect and writing special characters following the defect indicating the end of the defect.

In a further embodiment of the present invention, a preamble data pattern is written within the sequence of defect matrices to permit data clock resynchronization.

A system for certifying that a track of magnetic media is defective is also provided. The system includes a tape head for accessing the tape. The tape head includes a read module following a write module in a direction of tape travel past the tape head. The write module simultaneously writes at least one data track on the tape. The read module simultaneously reads at least one data track on the tape. The system also includes a write formatter for writing a sequence of defect matrices onto at least one data track. The number of defect matrices in the sequence is based on the defect length. The system also includes a read formatter which reads each defect matrix, detects an error in data read from the defect matrix, determines if the defect matrix contains a defect based on error detection, and determines the defect length based on defect matrices in the sequence determined to have a defect.

The above objects and other objects, features, and advantages of the present invention are readily apparent from the following detailed description of the best mode for carrying out the invention when taken in connection with the accompanying drawings.

BRIEF DESCRIPTION OF DRAWINGS

FIG. 2 is a schematic diagram of a data track with a defect which has just been detected by a read-after-write operation;

FIG. 3 is a schematic diagram of a data track with a defect which has been certified according to an embodiment of the present invention;

BEST MODE FOR CARRYING OUT THE INVENTION

Figure 1:
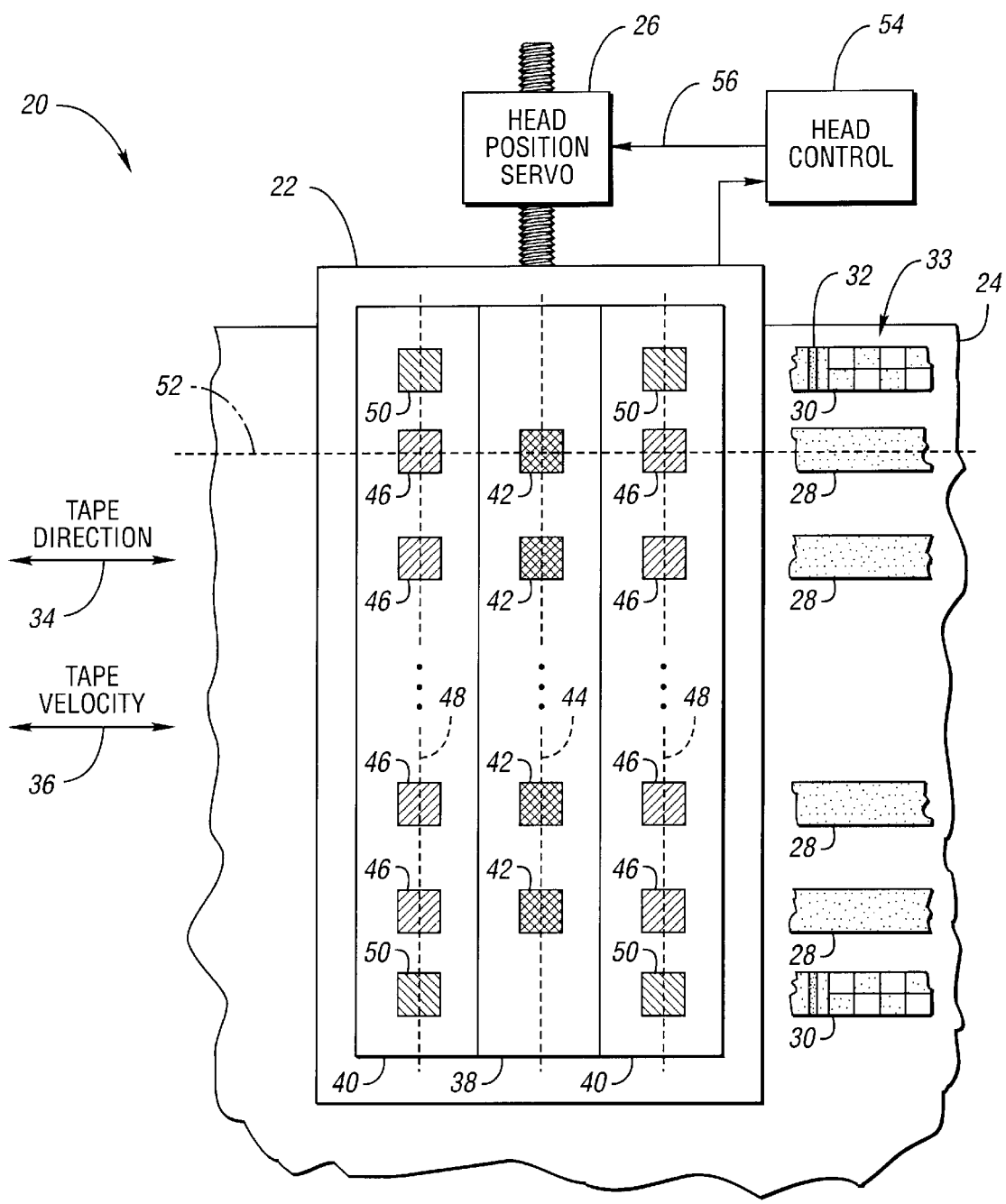
FIG. 1 is a schematic diagram of a magnetic tape and tape head system that may be used with the present invention.

Referring now to FIG. 1, a schematic diagram of a magnetic tape and tape head system that may be used with the present invention is shown. A tape system, shown generally by 20, includes tape head 22 for accessing magnetic tape 24. Tape head 22 is positioned relative to tape 24 by head position servo 26. Tape 24 includes a plurality of data tracks 28 spaced across the width of tape 24. Tape 24 also includes at least one servo track 30 written along the length of tape 24. Each servo track 30 may include periodically spaced features such as synchronization field 32 and tracking pattern 33. Tape 24 travels across tape head 22 in either tape direction 34 with tape velocity 36. Only a portion of each data track 28 and servo track 30 are shown and only an outline for a portion of tape 24 is provided to permit the details of tape head 22 to be seen.

Tape head 22 in FIG. 1 includes one write module 38 between two read modules 40 to form a read-write-read head. Write module 38 includes a plurality of write elements 42 constructed to lie along write element axis 44. Write elements 42 are magnetic circuits which induce field patterns in data tracks 28 as tape 24 moves past a gap in write element 42. Read module 40 is manufactured to have a plurality of read elements 46 constructed along read element axis 48. Read module 40 also includes at least one servo read element 50 aligned with read element axis 48. Read elements 46 and servo read elements 50 sense field patterns written onto data tracks 28 and servo strips 30 respectively by detecting changes in inductance or magnetoresistance induced by the field patterns. It will be recognized by one of ordinary skill in the art that the present invention does not depend on the design and construction of write elements 42, read elements 46, servo read elements 50, or head 22.

Ideally, data track axis 52 running through the center of data track 28 is perpendicular to write element axis 44 and read element axis 48. Also, data track axis 52 passes through the center of each write element 42 and read element 46 which access data track 28. During tracking problems, the data track axis 52 drifts away from the centers of elements 42, 46. This may result in overwriting adjacent tracks during a write operation.

Servo read element 50 is positioned to read tracking pattern 33 on servo track 30. Head control 54 in communication with each servo read element 50 detects tracking pattern 33 and determines the offset of tape 24 relative to tape head 22 in the direction normal to tape direction 34. If head control 54 detects that servo track 30 is not centered on servo read element 50, head control 54 generates positioning signal 56 causing head position servo 26 to move tape head 22 relative to tape 24 until servo track 30 is centered across servo read element 50. This centers data track 28 across write element 42 and read elements 46 operative to access data track 28.

Many tracking patterns 33 are known in the art of magnetic tape recording. One technique is to write a frequency on servo track 30 and erase portions of the background frequency to produce a checkerboard pattern. As tracking pattern 33 passes under servo read element 50, if servo track 30 is centered under servo read element 50, the strength of the background frequency signal will be at half the strength of the background signal read from servo track 30 not part of tracking pattern 33. If tape 24 is shifted relative to tape head 22, the background signal will be relative stronger during one portion of tracking pattern 33 and relatively weaker during another portion of tracking pattern 33. By comparing the relative strengths, the offset of servo track 30 relative to servo read element 50 can be determined.

Referring now to FIG. 2, a schematic diagram of a data track with a defect which has just been detected by a read-after-write operation is shown. Data track 28 has a defective area including defects 80. Data block 82 was correctly written onto data track 28 prior to defects 80. However, the next data block, shown generally by 84, overlaps defect 80. Data block 84 is written by tape head 22 as a sequence of data matrices 86,88. Write element 42 in tape head 22 writes each matrix 86,88 as data track 28 passes tape head 22 in tape direction 34. Matrices 86 written before defect 80 are read by read element 46 and determined to be good. When read element 46 reads the first bad data matrix 88, tape system 20 determines a write error occurred while writing data block 84. More than one bad data matrix 88 may be written onto data track 28 prior to discovering the write error due to spacing between write element 42 and read element 46 in tape head 22.

Once tape system 20 determines that a write error occurred while writing data block 84, write operations on data track 28 are halted. Typically, tape system 20 attempts to determine the cause of the error in data block 84. If various other factors such as tape velocity and tape position can be eliminated, tape system 20 assumes that data track 28 contains defect 80. This may be verified by attempting to write data block 84 multiple times.

Referring now to FIG. 3, a schematic diagram of a data track with a defect which has been certified according to an embodiment of the present invention is shown. Once the start of defect 80 in data track 28 has been detected, a sequence of defect matrices forming data certifier block 100 is written onto data track 28. Write element 42 writes each defect matrix 102,104 to have a worst-case data pattern. Read element 46 reads each defect matrix 102,104. Some defect matrices 102, such as those occurring before defect 80, may be defect-free. Tape system 20 examines data from read element 46 to determine if an error exists in each defect matrix 102,104. In this manner, the defective region in data track 28 is determined by tape system 20 on the fly.

Worst case data pattern refers to one or more patterns that create the most difficulty when reading. Worst case data patterns depend on a variety of factors including the type of encoding and decoding used. For example, if data is encoded using a 1–7 code, a data pattern of six zeros and a single one might produce a worst case data pattern on data track 28.

In an embodiment of the present invention, tape system 20 counts the number of good matrices 102 occurring after matrix 104 containing a defect. If the number of such consecutive defect-free defect matrices 102 is below a threshold, tape system 20 treats this region as one continuous defect 80. Hence, the region in data track 28 following defect 80 will contain a fixed number of defect-free defect matrices 102.

In an embodiment of the present invention, special marks 106 may be written before and after data certifier block 100. Special marks 106 may contain information indicating the length or duration of data certifier block 100.

Figure 4:
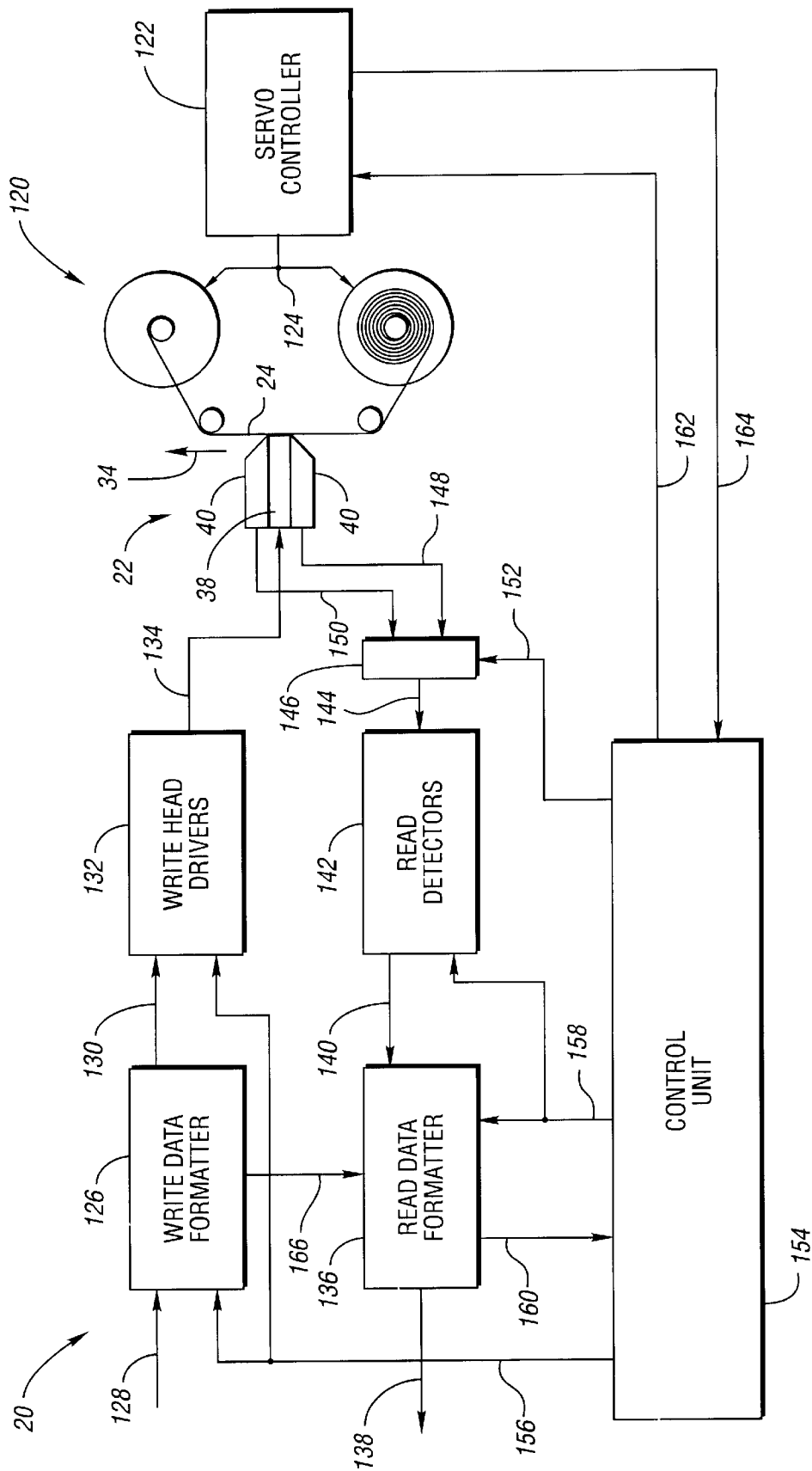
FIG. 4 is a block diagram of a system for certifying magnetic tape according to an embodiment of the present invention.

Referring now to FIG. 4, a block diagram of a system for certifying magnetic tape according to an embodiment of the present invention is shown. Tape system 20 includes a tape drive, shown generally by 120, for moving tape 24 past head 22 in tape direction 34. Servo controller 122 generates servo signals 124 for tape drive 120 to set the speed and direction of tape 24. Write data formatter 126 accepts input data 128 and generates formatted data 130. Data formatting may include partitioning data for simultaneous storage on data tracks 28, introducing error detection and correction information, encoding, and the like. Write head drivers 132 accept formatted data 130 and generate write signals 134 for each write element 42 in write module 38. Read data formatter 136 generates output data 138 from read data 140 by performing the reverse operations of write data formatter 126. Read detectors 142 include pre-amplifiers and pulse detectors for generating read data 140 from read signals 144. Selector 146 outputs as read signals 144 either leading read signals 148 from read elements 46 in leading read module 40 or trailing read signals 150 from read elements 46 in trailing read module 40 based on select control signal 152.

Control unit 154 sets select control signal 152. Control unit 154 also generates write enable 156 and read enable 158 controlling write circuitry 126,132 and read circuitry 136, 142, respectively. Control unit 154 accepts status signal 160 from read data formatter 136 indicating, among other parameters, the end of a block of read data. Control unit 154 generates servo control signal 162 to servo controller 122 and receives servo status signals 164 from servo controller 122 indicating tape position and tape velocity errors. Write formatter 126 generates timing signals 166 for read formatter 136. Timing signals 166, based on generating signals for writing defect matrices 102, 104, assist read formatter 136 in generating clock signals used in reading data from defect matrices 104 containing defect 80. For example, write data formatter 126 may generate signal 166 for read data formatter 136 at the start of writing each defect matrix 102, 104. If read data formatter 136 knows the speed of tape 24 and the spacing between write element 42 and read element 46, read data formatter can then determine the approximate time to begin reading defect matrix 102, 104.

Figure 5:
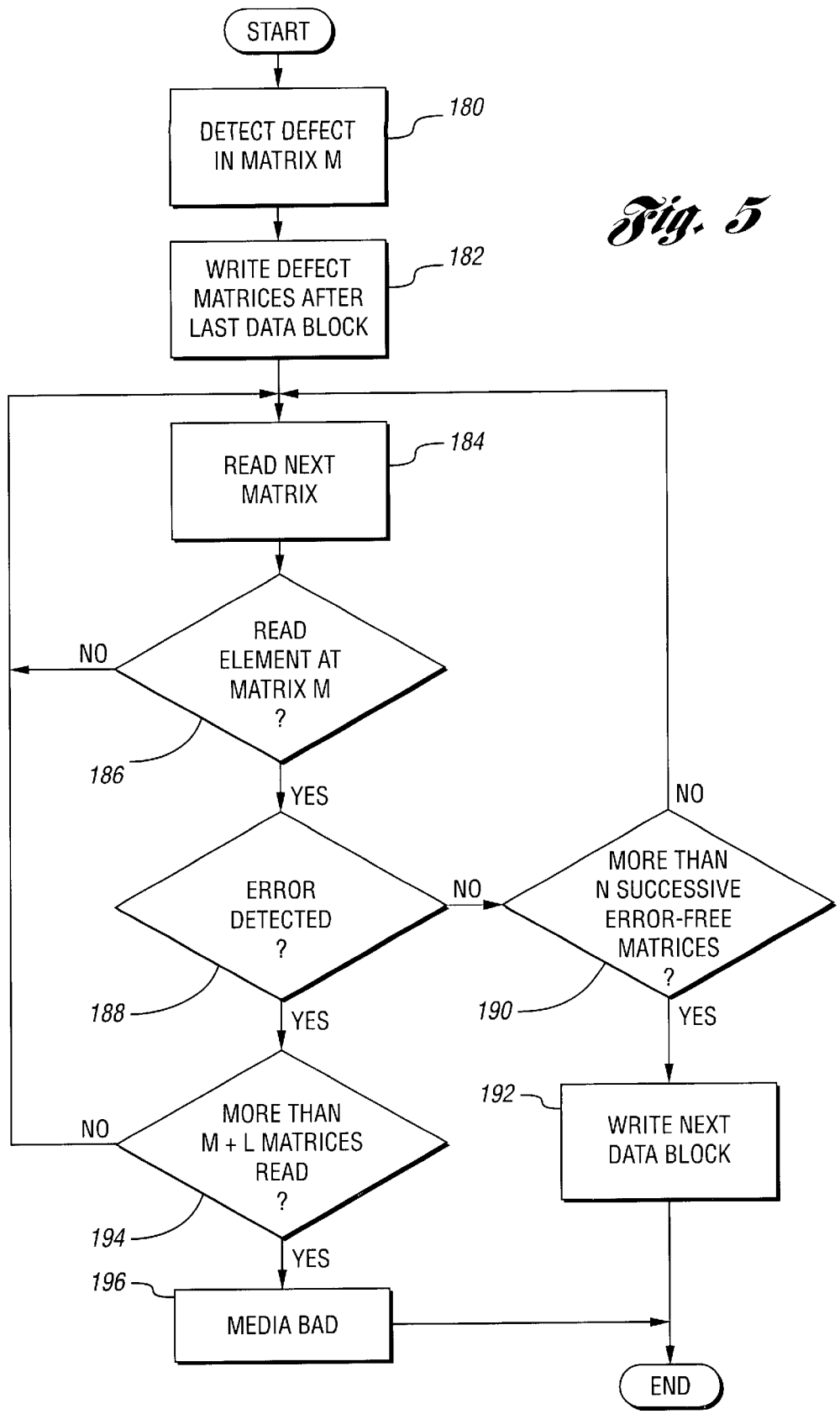
FIG. 5 is a flow diagram of a method for certifying magnetic media according to an embodiment of the present invention.

Referring now to FIG. 5, a flow diagram of a method for certifying magnetic media according to an embodiment of the present invention is shown. As will be appreciated by one of ordinary skill in the art, the operations illustrated are not necessarily sequential operations. Similarly, operations may be performed by software, hardware, or a combination of both. The present invention transcends any particular implementation and aspects are shown in sequential flow chart form for ease of illustration.

A defect is detected in matrix M in 180. While attempting to write data block 84, the first bad data matrix 88 after M−1 good data matrices 86 is detected. Tape 24 is then rewound and forwarded to the end of the last successfully written data block 82. Defect matrices 102,104 are written following data block 82 in 182.

The next defect matrix is read 184. Read element 46 reads defect matrix 102,104 from data track 28. A check is made to determine if read element 46 is at the $M^{th}$ defect matrix 102,104 in 186. If not, the next defect matrix 102,104 is read in 184. Since the defect was first detected in the $M^{th}$ data matrix 88, there is no need to check for defect 80 prior to the $M^{th}$ defect matrix 102,104.

Once past the $M^{th}$ matrix, each matrix 102,104 is checked for a write error in 188. Read data 140 is examined by read formatter 136 to determine if an error has occurred. Two types of errors may occur. In the first error type, read element 46 does not detect a signal of sufficient quality to extract timing information. In this case, read data formatter 136 determines the start of the next matrix based on signal 166 from write data formatter 126. In the second error type, timing information sufficient to extract data from defect matrix 104 is recovered, but the data includes uncorrectable errors. To assist in establishing data recovery clocking, preamble timing information may be included within data certifier block 100. Preamble information such as, for example, a long string of alternating ones and zeros, permits resynchronization of the phase locked loop data clock in read data formatter 136.

If no error has occurred, a check is made to determine if more than N successive error-free matrices 102 have occurred in 190. The threshold number N is set to balance two conflicting goals. First, small numbers of defect-free defect matrices 102 may be written between defects 80 on data track 28 too closely spaced to hold data block 84. Hence, attempting to write data block 84 after each defect-free defect matrix 102 is found may result in unnecessary time spent in unsuccessful attempts to write data block 84. Second, if N is too large, defect-free areas of data track 28 will go unused. This decreases the density of data stored on magnetic tape 24. If more than N successive error-free matrices 102 are detected, data block 84 is written onto data track 28 in 192. If less than N successive error-free matrices 102 are detected, the next matrix 102,104 is read in block 184.

If an error is detected in defect matrix 104, a check is made to determine if more than M+L matrices 102,104 have been read in 194. The threshold number L sets the point at which tape system 20 will determine that tape 24 should no longer be used. If more than M+L matrices 102,104 have been read, the magnetic media is indicated to be bad in 196. If not, the next matrix is read in 184.

While embodiments of the invention have been illustrated and described, it is not intended that these embodiments illustrate and describe all possible forms of the invention. Rather, the words used in the specification are words of description rather than limitation, and that various changes may be made without departing from the spirit and scope of the invention. For example, the term defect applies to more than just media damaged in a data track. A defect could include regions of media in which tracking errors occur. Further, the invention applies to other types of media in addition to magnetic tape.

What is claimed is:

1. A method for certifying that a track of magnetic media is defective, the track accessed by a read-after-write head, the method comprising:

detecting the start of a defect;

writing a sequence of defect matrices over the defect with a write element in the read-after-write head based on the detected defect start;

reading each defect matrix in the sequence of defect matrices with a read element in the read-after-write head;

determining if an error exists in data read from each defect matrix; and determining that the defect extends through each defect matrix if an error exists in the read data.

2. A method for certifying that a track of magnetic media is defective as in claim 1 further comprising counting the number of consecutive defect matrices not containing an error in read data and determining that the defect has ended when the number of consecutive error free defect matrices exceeds a threshold.

3. A method for certifying that a track of magnetic media is defective as in claim 1 further comprising writing a preset number of defect matrices following a last defect matrix containing the defect.

4. A method for certifying that a track of magnetic media is defective as in claim 1 further comprising counting the number of defect matrices prior to locating the defect end and terminating the defect certification if the number of counted defect matrices exceeds a threshold.

5. A method for certifying that a track of magnetic media is defective as in claim 1 further comprising writing special characters preceding the defect indicating the start of the defect and writing special characters following the defect indicating the end of the defect.

6. A method for certifying that a track of magnetic media is defective as in claim 1 wherein each defect matrix comprises a worst case data pattern.

7. A method for certifying that a track of magnetic media is defective as in claim 1 further comprising writing at least one preamble data pattern within the sequence of defect matrices.

8. A system for certifying that a track on a magnetic tape is defective comprising:

a tape head for accessing the tape, the tape head comprising a read module following a write module in a direction of tape travel past the tape head, the write module operative to simultaneously write at least one data track on the tape, the read module operative to simultaneously read at least one data track on the tape;

a write formatter in communication with the write module, the write formatter operative to write a sequence of defect matrices onto at least one data track, the number of defect matrices in the sequence based on a determined defect length;

a read formatter in communication with the read module, the read formatter operative to
   a) read each defect matrix,
   b) detect an error in data read from the defect matrix,
   c) determine if the defect matrix contains a defect based on error detection, and
   d) determine the defect length based on defect matrices in the sequence of defect matrices determined to have a defect.

9. A system for certifying that a track on a magnetic tape is defective as in claim 8 wherein the read formatter is further operative to count the number of consecutive defect matrices not containing an error in read data and to determine that the defect has ended when the number of consecutive error free defect matrices exceeds a threshold.

10. A system for certifying that a track on a magnetic tape is defective as in claim 8 wherein the write formatter is further operative to write a preset number of defect matrices following a last defect matrix containing the defect.

11. A system for certifying that a track on a magnetic tape is defective as in claim 8 wherein the write formatter is further operative to count the number of defect matrices prior to the defect end and to terminate the defect certification if the number of counted defect matrices exceeds a threshold.

12. A system for certifying that a track on a magnetic tape is defective as in claim 8 wherein the write formatter is further operative to write special characters preceding the defect indicating the start of the defect and to write special characters following the defect indicating the end of the defect.

13. A system for certifying that a track on a magnetic tape is defective as in claim 8 wherein the write formatter is further operative to signal the read formatter that each defect matrix is written.

14. A system for certifying that a track on a magnetic tape is defective as in claim 8 wherein each defect matrix comprises a worst case data pattern.

15. A system for certifying that a track on a magnetic tape is defective as in claim 8 wherein the write formatter is further operative to write at least one preamble data pattern within the sequence of defect matrices.

16. A system for certifying that a track of magnetic media is defective, the track accessed by a head having a read module following a write module in a direction of media travel past the head, the write module operative to simultaneously write at least one data track on the media, the read module operative to simultaneously read at least one data track on the media, the system comprising:

means for detecting the start of a defect;

means for writing a sequence of defect matrices over the defect with a write element in the write module;

means for reading each defect matrix in the sequence of defect matrices with a read element in the read module;

means for determining if an error exists in data read from each defect matrix; and means for determining that the defect extends through each defect matrix if an error exists in the read data.

17. A system for certifying that a track of magnetic media is defective as in claim 16 further comprising means for writing a preset number of defect matrices following a last defect matrix containing the defect.

18. A system for certifying that a track of magnetic media is defective as in claim 16 means for counting the number of defect matrices prior to the defect end and terminating the defect certification if the number of counted defect matrices exceeds a threshold.

19. A system for certifying that a track of magnetic media is defective as in claim 16 further comprising means for writing special characters preceding the defect and following the defect, the special characters indicating the defect duration.

20. A system for certifying that a track of magnetic media is defective as in claim 16 further comprising means for signaling the means for determining if an error exists in data read from each defect matrix that each matrix is written.

* * * * *